US006573454B2

(12) United States Patent
Fujiwara

(10) Patent No.: US 6,573,454 B2
(45) Date of Patent: Jun. 3, 2003

(54) ELECTRIC DISTRIBUTION ASSEMBLY

(75) Inventor: Hidemichi Fujiwara, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/993,458

(22) Filed: Nov. 13, 2001

(65) Prior Publication Data

US 2002/0162683 A1 Nov. 7, 2002

Related U.S. Application Data

(63) Continuation of application No. PCT/JP01/05348, filed on Jun. 22, 2001.

(51) Int. Cl.[7] .................................................. G02B 5/32
(52) U.S. Cl. ...................................................... 174/74 R
(58) Field of Search ............................. 174/75 C, 74 R, 174/78, 84 C; 428/472.2

(56) References Cited

U.S. PATENT DOCUMENTS 5,104,743 A * 4/1992 Nishikawa et al. ......... 101/459
5,532,910 A * 7/1996 Suzuki et al. .............. 174/52.4
6,239,373 B1 * 5/2001 Sato et al. ................ 174/75 C

FOREIGN PATENT DOCUMENTS

| | | |
|---|---|---|
| JP | 59-107067 | * 6/1984 |
| JP | 3-39441 | * 2/1991 |
| JP | 4-301046 | * 10/1992 |
| JP | 8-132129 | * 5/1996 |

* cited by examiner

*Primary Examiner*—Chau N. Nguyen
(74) *Attorney, Agent, or Firm*—Knobbe Martens Olson & Bear LLP

(57) ABSTRACT

An electric distributor assembly for movable vehicle is provided which has a distribution cable which is easier to handle, having both a metal terminal excellent in workability and an Al alloy twisted wire conductor connected to the terminal so as to show superior connection characteristics. The twisted-wire conductor may be made of an Al or Al alloy which has conductivity of 50% IACS or more. The metal terminal is made of, preferably, an Al or Al alloy of which elongation is 20% or more. The terminal is connected with the cable conductor, preferably, with ultrasonic vibrations.

8 Claims, 2 Drawing Sheets

ELECTRIC DISTRIBUTION ASSEMBLY

This application is a continuation of International Application number PCT/JP01/05348, filed on Jun. 22, 2001. The international application is not yet published.

TECHNICAL FIELD

The present invention relates to an electric distributor assembly preferable for movable means such as vehicles including automobiles, which are required to be lightened, and in particular, to an electric distributor assembly made by an aluminum twisted cable conductor and an aluminum-made terminal attached to the cable conductor (hereafter, the term "aluminum" is often noted as "Al").

BACKGROUND ART

Copper assemblies have conventionally been used as distribution assemblies for automobiles in the form of harness wires, battery cables, and others mounted thereon. Each assembly has not only a distribution cable of which conductors are copper twisted wires but also copper terminals coupled to the cable. In such circumstances, a recent trend is that a new type of automobile of which drive power is partly or entirely supplied by electric power has been under development. One key factor in the development is what type of electric distributor assembly should be used. It has been considered that an Al assembly including a distribution cable made of Al-twisted wires and Al terminals coupled to the cable should be used for such electric distributor assembly, because there is an advantage of being lighter in weight which stems from aluminum.

However, the Al assembly has various problems. In other words, using the Al-made assembly for a long time causes a thick oxide layer generated between connected boundary faces of the Al twisted-wire conductor and each Al terminal. Additionally, in a corrosive environment, the Al-made assembly is easier to be corroded. If being placed in such a corrosive environment, contact resistance between the Al-made twisted-wire conductor and the Al terminal increases little by little, thus a connection characteristic therebetween being spoiled in course of time.

To overcome those problems, plating the Al-made twisted wires with a corrosion resistant metal like Ni was conceived, but has not been practiced because of the problems in the production process.

Additionally, the Al electric distributor assembly is poor in flexibility, thus making handling of the distribution cable difficult and causing cracks within the terminal while the assembly is formed or mounted.

An object of the present invention is to provide a distribution cable assembly for movable means whose cable is easier to be handled, whose terminals are excellent in workability, and which has an excellent connection characteristic between an Al twisted-wire conductor of the cable and each Al terminal.

DISCLOSURE OF THE INVENTION

A first embodiment of the present invention is an electric distributor assembly comprising a distribution cable composed of an insulation-coated twisted-wire conductor and a connecting terminal connected to one end of the conductor, wherein the twisted-wire conductor is made of an aluminum metal or an aluminum alloy of which conductivity is 50% or more under IACS, the connecting terminal connected to the twisted-wire conductor is made of a metal, and the twisted wire conductor and the connecting terminal are connected by pressure welding with ultrasonic vibrations.

A second embodiment of the present invention is an electric distributor assembly in which the aluminum alloy composing the twisted-wire conductor consists of Zr: 0.03 to 0.4 wt %, Fe: 0.05 to 0.2 wt %, and Si: 0.05 to 0.2 wt % and further includes in total 0.003 to 0.05 wt % of one or more elements selected from Be, Sr, Mg, Ti and V, and the balance consists of Al and unavoidable impurities.

A third embodiment of the present invention is an electric distributor assembly in which the metal for the connecting terminal connected to the twisted-wire conductor is an aluminum metal or aluminum alloy whose elongation is 20% or more.

A fourth embodiment of the present invention is an electric distributor assembly in which the aluminum alloy composing the connecting terminal consists of Zr: 0.03 to 0.4 wt % and Si: 0.05 to 0.15 wt % and the balance consists of Al and unavoidable impurities.

A fifth embodiment of the present invention is an electric distributor assembly in which the aluminum alloy composing the terminal includes Mg: 0.3 to 1.8 wt %, Si: 0.15 to 1.5 wt %, Fe: 0.1 to 1.0 wt %, and Cu: 0.05 to 0.5 wt % and further includes in total 0.03 to 0.6 wt % of one or more than one selected from Mn, Cr and Ti, and the balance consists of Al and unavoidable impurities.

A sixth embodiment of the present invention is an electric distributor assembly in which the metal for the terminal is coated on its surface with Ni or an nickel alloy with a thickness of 5 $\mu$m or less.

A seventh embodiment of the present invention is an electric distributor assembly comprising an electromagnetic shielding metal layer covering an outer surface thereof and an insulation-coated layer covering an outer surface of the metal layer.

An eight embodiment of the present invention is an electric distributor assembly in which the electromagnetic shielding metal layer is composed of a reticulated member made of aluminum or aluminum alloy.

BRIEF DESCRIPTION OF THE PREFERRED EMBODIMENTS

Figure 1A:
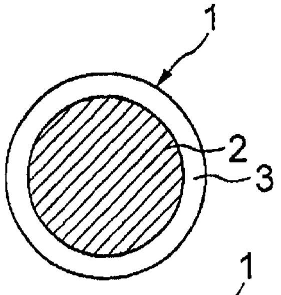
FIG. 1A is a cross section showing an embodiment of a distribution cable of the electric distributor assembly according to the present invention.
Figure 1B:
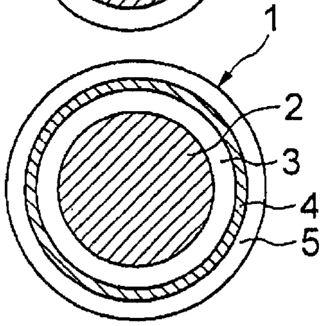
FIG. 1B is a cross section showing another embodiment of a distribution cable of the electric distributor assembly according to the present invention.

A distribution cable 1, which is part of the electric distributor assembly of the present invention, includes an Al twisted-wire conductor 2 as shown in FIG. 1A or 1B. Specifically, FIG. 1A shows the conductor 2 of which an outer surface is coated with an insulating layer 3. On the other hand, FIG. 1B shows the conductor 2 whose outer surface is coated with a series of layers consisting of an insulating layer 3, magnetic shielding layer 4, and a further insulating layer 5 layered one on another in this order.

The Al twisted-wire conductor 2 defined by the present invention includes an ordinary Al twisted-wire conductor made by twisting a plurality of Al strands as well as any conductor fabricated from a plurality of Al strands, such as a conductor comprising combined Al strands. In this specification aluminum or aluminum metal refers to so-called pure aluminum of all grades defined in JIS (Japanese Industrial Standard) 1085, 1080, 1070 etc or ASTM and aluminum alloy refers to all kinds of aluminum alloy defined in JIS or ASTM.

The reason why the present invention requires the Al twisted-wire conductor to have a conductivity of 50% or more under IACS (International Annealed Copper Standard) can be explained as follows. In cases where the conductivity is less than 50% under IACS, supplying desired amounts of current through the Al twisted-wire conductor requires the conductor with a larger outer diameter, which deteriorates the flexibility of the conductor. A larger outer diameter is opposed to a trend of lightening in weight the assembly, thereby increasing cost in material. The flexibility of the Al twisted-wire conductor is ensured by making the Al strand thinner down to 0.8 mm or less in diameter.

Figure 2A:
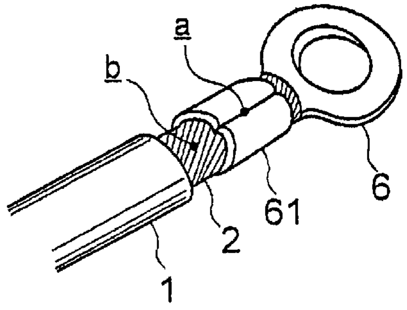
FIG. 2A is a perspective view showing a connected state of a metal terminal employed by one embodiment of the electric distributor assembly according to the present invention.

A metal terminal, which constitutes part of the electric distributor assembly according to the present invention, can be produced using copper, copper alloy, aluminum, or aluminum alloy, which are higher in electric conductivity. From a view point to reduce the weight, however, it is preferable to use aluminum or aluminum alloy as a material for the terminal. As shown in FIG. 2A, an open barrel type of terminal 6 is provided as the metal terminal, which has a grasping member 61 for grasping the Al twisted-wire conductor 2.

Figure 2B:
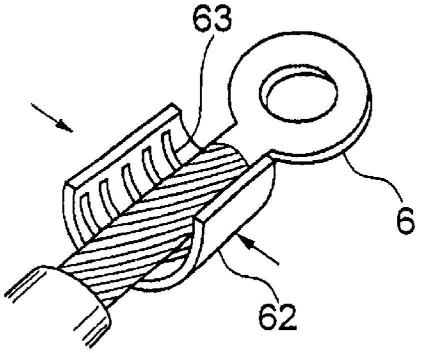
FIG. 2B is a developed perspective view of a metal terminal having grooves or serrations on its inner surface, shown according to another embodiment of the present invention.
Figure 3:
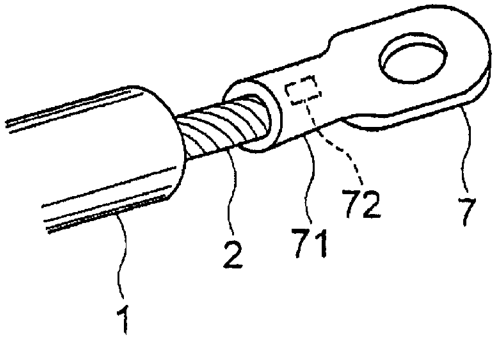
FIG. 3 is a perspective view showing further another embodiment of a metal-made terminal mounted in the electric distributor assembly according to the present invention.

In the open barrel type of terminal 6 shown in FIG. 2B, there are formed a plurality of grooves or serrations 63 on the inner surface of a grasping element 62, which is to be pressed onto the Al twisted-wire conductor 2. The grooves or serrations are made parallel to the direction orthogonal to the longitudinal direction of the conductor 2. In a press working operation, those grooves or serrations operate to allow both of the conductor 2 and the grooves or serrations 63 to engage with each other, which brings forth an advantage that the metal terminal 6 is prevented from being pulled easily from the Al-made twisted-wire conductor 2. FIG. 3 shows another embodiment of the metal terminal, wherein a terminal 7 is integrally coupled with a tube type of grasping element 71 on which a rectangular location 72 is formed by pressing for contact.

Figure 4:
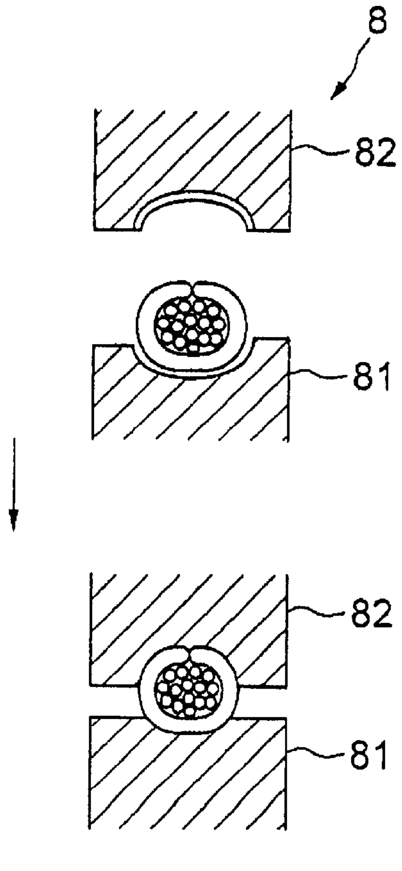
FIG. 4 exemplifies how to press a metal-made terminal with ultrasonic vibrations, the terminal being mounted in the electric distributor assembly according to the present invention.

The connection of the grasping member 61 or 62 with the twisted-wire conductor 2 is shown in FIG. 2A or FIG. 2B. Such connection, which is normally performed in an ordinary temperature condition, is realized by using a press machine 8, which is called pressure welding as a general term. Practically, as shown in FIG. 4, a reception base 81 of the machine 8 accepts the grasping member 61 or 62 in which the twisted-wire conductor 2 is placed. Then a press head 82 thereof is pressed, with ultrasonic vibrations, onto the grasping member 61 or 62 on the base 81. The frequency of ultrasonic wave is preferably 10 to 30 kHz, by way of example. Meanwhile, the method of pressing shown in FIG. 4 is just one example and does not limit the scope of the present invention.

In the present invention, for the metal terminal to be made from aluminum or aluminum alloy, it is preferred that the elongation thereof is set to an amount of 20% or more. The reason is that if the elongation is less than 20%, the workability is poor, so that cracks may be caused within the Al terminal in forming the metal to the terminal or in bonding the terminal onto the Al twisted-wire conductor by pressure welding.

The present invention uses the pressure welding as bonding technique to attach the metal terminal to the Al twisted-wire conductor. The reason that the pressure welding is used is that its attachment operation is easier in handling and provides an excellent productivity. In addition, the reason that the pressure welding is done with vibrations generated by ultrasonic waves in the present invention is as follows. Giving vibrations derived from the ultrasonic waves can destroy the oxide layers of both of the each strand itself of the conductor and the terminal. Hence, the twisted strands themselves are mutually bonded to form a single conductor and both the twisted-wire conductor and the metal terminal are metal-bonded to each other. Those metal bonding reduce contact resistance, providing a good connection characteristic in a stable manner.

In the present invention, any aluminum or aluminum alloy can be used as the Al twisted-wire conductor as for the distribution cable, if it has 50% or more conductivity under IACS. In particular, a preferable component composition of the Al alloy is as follows: the Al alloy consists of; Zr: 0.03 to 0.4 wt %, Fe: 0.05 to 0.2 wt %, and Si: 0.05 to 0.2 wt % and further includes in total 0.003 to 0.05 wt % of one or more elements selected from Be, Sr, Mg, Ti and V, and the balance thereof consists of Al and unavoidable impurities.

The Al alloy thus composed is excellent in strength, conductivity, creep resistance, and others, so it can be used best. The Al alloy also has the advantage that its oxide layer grows at slower speeds. Thus, contact resistance among the strands of the Al twisted-wire conductor is kept lower for a longer time, providing a higher, stable conductivity in course of time.

In the Al alloy, Zr is partly solved in matrix and partly precipitated, with the result that creep resistance is raised. The reason that Zr is regulated to a content of ranging from 0.03 to 0.4 wt % is that if the content is less than 0.03 wt %, the advantages of the Al alloy are not fully realized, while it exceeds 0.4 wt %, the conductivity is fairly reduced.

Si is employed to promote precipitation of Zr, thereby raising both of conductivity and the characteristic of creep resistance. The reason that Si is confined to a content of 0.05 to 0.2 wt % is derived from the fact that its content of less than 0.05 wt % gives no sufficient advantage, whilst that higher than 0.2 wt % reduces the conductivity.

Fe is employed to increase heat resistance. Why Fe is limited to a content of 0.05 to 0.2 wt % is derived from the fact that its content of less than 0.05 wt % gives no sufficient advantage, whilst that higher than 0.2 wt % reduces the conductivity.

One or more elements selected from Be, Sr, Mg, Ti and V contributes to raising the strength of the Al alloy by solution and precipitation and to raising the conductivity and creep resistance characteristics by promoting the deposition of the Zr. The elements are selected in total to a content of 0.003 to 0.05 wt %. This is because the total content of less than 0.003 wt % gives no sufficient advantage, whilst that higher than 0.05 wt % causes the advantage to be saturated.

The Al alloy can be formed into twisted strands through conventional techniques. By way of example, the melt of the Al alloy is formed into a cast by continuous casting and the cast is hot-rolled to hot-rolled materials. And the hot-rolled material is formed into twisted strands by cold working. It is preferred that an aging treatment is performed on the hot-rolled materials during the cold working or after the cold working so that the strength and conductivity thereof are adjusted to desired values.

In the present invention, it is preferable that, as the metal terminal, any Al or Al alloy of which elongation is 20% or more is used. Particularly, a preferred component composition of the alloy is an Al—Zr—Si alloy that consists of:

Zr: 0.03 to 0.4 wt % and Si: 0.05 to 0.15 wt %, and the balance consists of Al and unavoidable impurities.

In the above Al—Zr—Si alloy, Zr, which increases the creep resistance of the alloy, is confined to a content of 0.03 to 0.4 wt %. This is because the content of less than 0.03 wt % gives no sufficient advantage, while that higher than 0.4 wt % reduces its conductivity.

Adding Si promotes the precipitation of Zr to increase the conductivity of the creep resistance characteristic of the terminal. The reason the content of Si is 0.05 to 0.15 wt % is that the content of less than 0.05 wt % gives no sufficient advantage, while that higher than 0.15 wt % reduces the conductivity of the alloy.

Furthermore, it is preferred to use another Al alloy as the metal terminal which consists of;

Mg: 0.3 to 1.8 wt %, Si: 0.15 to 1.5 wt %, Fe: 0.1 to 1.0 wt %, and Cu: 0.05 to 0.5 wt %, which can further includes one or more elements in a total content of 0.03 to 0.6 wt % selected from a group of Mn, Cr, and Ti, and the balance of which consists of Al and unavoidable impurities. This alloy has an electric conductivity of 40% IACS or more and a high creep strength, and hence the alloy is preferably used for the metal terminal.

In this Al—Mg—Si—Fe—Cu family alloy, Mg and Si react to each other so as to form a compound, so that the creep resistance characteristic is raised. The reason that the content of Mg is limited to 0.3 to 1.8 wt % and Si is limited to 0.15 to 1.5 wt % is that either element of the content of less than each lower limit gives no sufficient advantage, while that higher than each upper limit reduces the conductivity of the alloy.

Fe contained in this alloy undergoes solution or deposition to enhance the creep resistance characteristic of the alloy. The reason the content of Fe is 0.1 to 1.0 wt % relies on the fact that the content of less than 0.1 wt % gives no sufficient advantage, while that higher than 1.0 wt % reduces the conductivity of the alloy.

Cu contained in this alloy is also soluble in the matrix and precipitated so that it improves the creep resistance characteristic of the alloy. The reason that the content of Cu is regulated to 0.05 to 0.5 wt % is that the content of less than 0.05 wt % gives no sufficient advantage, while that higher than 0.5 wt % reduces the conductivity of the alloy.

In the present invention, an Al alloy, from which the terminal is made, is machined into tubing material, rod material, bar material, or others. Then such material undergoes bending, cutting, stamping, and/or others so that a terminal is formed.

The tubing material like rod material or bar material is formed by following method:

(1) a conform-extruding of the hot drawing;
(2) a cold rolling of the conform-extruded material; and
(3) a continuously casting of an Al alloy into a billet, hot extruding or hot rolling the cast alloy, cold rolling the extruded or rolled alloy, then cutting the cold-rolled alloy into a terminal having a predetermined size.

In the working of the alloy based on the foregoing forming methods, it is preferred that an aging treatment be performed in a proper manner in the course of the working or at the final stage of the working, so that the terminal is formed with higher conductivity and higher strength.

In a corrosive environment, a conventional Al assembly was easily corroded. When the assembly was placed in such a corrosive environment, contact resistance between the Al-made twisted-wire conductor and the Al terminal increased little by little, thus a connection characteristic therebetween was spoiled in course of time. Therefore plating the Al twisted wires with Ni, which is superior in both oxidation resistance and corrosion resistance, was conceived, but has not been practiced because of the problems in the production process as stated below.

(1) Plating a large-diameter Al wire with Ni before drawing it into a strand to be twisted is excellent in productivity, but the plated layer is apt to be peeled off or broken.

(2) Plating Ni on strands to be twisted leads to poor productivity.

(3) Plating Ni on a connected part of each Al terminal to the conductor of each Al-made twisted wire tends to cause corrosion because the plating solution permeates among the wires.

Meanwhile in the present invention, a Ni alloy of which substantial component is Ni, which is for example a Ni—P alloy or a Ni—B alloy, is preferably coated on the surface of the alloy without such problems in the production process as stated above. Because this coating improves the corrosion resistance of the terminal, the terminal can be used even in a corrosive environment. Galvanic corrosion, which might be occurred between the terminal and an external device to which the terminal is connected, can be avoided as well. In the present invention the thickness of the coating layer is limited to a thickness of 5 $\mu$m or less because of the following reasons. If such thickness is over 5 $\mu$m, there is a possibility that cracks occur within the terminal when an Al twisted conductor and the terminal are pressed for welding together. If the crack actually appears, the advantages of the pressure are spoiled. In order to coat the terminal with Ni, any method chosen from various methods, such as electroplating, electroless plating, pressure welding by rolling and physical deposition, can be used.

Some vehicles require a distribution cable to additionally be coated with a metal magnetic shielding layer, such as an Al net or a copper net, and a plurality of insulation layers. The magnetic shielding layer is used for shielding an electromagnetic field to be generated when electricity is supplied through the cable. The assembly according to the present invention is still effective for such a cable, that is, still advantageous regardless of such outer insulation structures of the distribution cable. This is because the magnetic shielding layer and a plurality of insulation layers, which are overlapped as outer layers on a distribution cable, will not change a function of delivering electricity through the cable. The insulation layers are formed with layers made from synthetic resin, such as vinyl chloride or polyolefin.

EXAMPLES

The present invention will now be explained in detail by examples.

Example 1

An Al alloy consisting of; Zr: 0.1 wt %, Fe: 0,1 wt %, Si: 0.1 wt %, Ti: 0.003 wt % and the balance is made up of Al and unavoidable impurities, was first prepared. This Al alloy was then prepared using a conventional procedure, and the prepared melt was subject to continuous casting and rolling so as to produce a rough-drawn wire (a hot-drawn material). This wire then underwent cold wire drawing to form a strand of 0.32 mm in diameter. 25-piece strands were then twisted together to form a twisted member. 19-piece twisted members were then further twisted together so that an Al twisted-wire conductor (represented by a reference A). This Al twisted-wire conductor was then subjected to coating of PVC by extrusion at a thickness of 1 mm, with the result that the distribution cable shown in FIG. 1A was made.

Moreover, a first Al alloy consisting of Zr: 0.1 wt %, Si: 0.1 wt % and the balance made up of Al and unavoidable impurities, and a second Al alloy consisting of Mg: 0.5 wt %, Si: 0.35 wt %, Fe: 0.1 wt %, Cu: 0.1 wt %, Mn: 0.1 wt %, and the balance made up of Al and unavoidable impurities were first prepared. Each of the first and second Al alloys was prepared and, then the melt of the first and second alloy were subject to continuous casting rolling so as to produce a rough-drawn wire. Each wire was used as a feed stock and subject to conform-extruding to extrude a plate of 45 mm in width and 2.5 mm in thickens. Each plate was cold-rolled into a plate of which thickness is 2.3 mm, and then this cold-rolled plate was annealed at 350 degrees in centigrade for 6 hours. The annealed plates were respectively subjected to press working and bending in this order, so that two types of open barrel terminals formed into the size BA 608 designated by the JIS (Japanese Industrial Standard) were made. Of such two type of terminals, one, represented by a reference Z, is made from the foregoing Al—Zr—Si alloy, and the other, represented by a reference M, from the foregoing Al—Mg—Si—Fe—Cu—Mn alloy (refer to FIGS. 2A and 2B).

Then, the foregoing terminals (Z and M) were individually welded to the Al twisted-wire conductor (A) applying ultrasonic vibration (at a condition of 1400 W for 1 sec.), thereby two types of assemblies (A/Z and A/M) were manufactured.

Comparative Example 1

An Al twisted-wire conductor, represented by a reference B, was first manufactured from a conventional Al alloy that consists of Mg: 4 wt %, Mn: 0.4 wt %, Fe: 0.5 wt %, Si: 0.4 wt %, Zn: 0.25 wt %, and the balance made up of Al and unavoidable impurities. The remaining manufacturing conditions were set to the same as those in the foregoing example 1, thus two types of assemblies (B/Z and B/M) were manufactured in the similar way.

Comparative Example 2

Although no ultrasonic vibrations were applied when the terminal Z or M was welded onto the Al twisted-wired conductor A, two types of assemblies were manufactured in a similar manner to that in the example 1.

Comparative Example 3

Although no ultrasonic vibrations were applied when the terminal Z or M was welded onto the Al twisted-wired conductor B, two types of assemblies were manufactured in a similar manner to that in the example 1.

Each of the assemblies manufactured in the example 1 and comparative example 1 to 3 underwent an energizing cycle test in which electric power of 4 kVA is turned on and off at 1, 10, 50, 100, 500 and 1000 cycles, respectively. After turning on and off at each cycle, electric resistance was measured between a certain location a on the terminal and a location b on the distribution cable, the location b being located 100 mm apart from the location a (refer to FIG. 2A). The life of the assemblies was measured as the number of energizing cycles obtained when the resistance exceeded an amount 1.5 times larger than its initial resistance. The results of the test are shown in Table 1.

TABLE 1

EC: electric conductivity

| Classification | | No. of specimen | Al twisted-wire conductor type | Al twisted-wire conductor EC % | Al terminal type | Al terminal EC % | Ultrasonic vibrations during welding | Life (The number of energizing cycles obtained when resistance exceeds 1.5 times larger than its initial resistance.) |
|---|---|---|---|---|---|---|---|---|
| The present invention | Example 1 | 1 | A | 59 | Z | 59 | applied | 1000 or more |
| | | 2 | A | 59 | M | 53 | applied | 1000 or more |
| Comparative Examples | Comparative Example 1 | 3 | B | 30 | Z | 60 | applied | 500 or less, but 101 or more |
| | | 4 | B | 30 | M | 52 | applied | 500 or less, but 101 or more |
| | Comparative Example 2 | 5 | A | 59 | Z | 59 | non-applied | 50 or less, but 11 or more |
| | | 6 | A | 59 | M | 52 | non-applied | 50 or less, but 11 or more |
| | Comparative Example 3 | 7 | B | 30 | Z | 59 | non-applied | 1 |
| | | 8 | B | 30 | M | 52 | non-applied | 1 |

As clear from Table 1, the assemblies according to the present invention (specimen Nos. 1 and 2) showed excellent terminal/cable connection characteristics. After the test at 1000 cycles, those assemblies according to the present invention exhibited electric resistance which is not more than 1.08 times larger than its initial value of electric resistance.

In contrast, the specimens of Nos. 3 and 4 manufactured in the comparative example 1 showed only a shorter life of 500 to 100 times with respect to energizing cycles, because the conductivity of the Al twisted-wire conductor was lower. In the case of the specimens of Nos. 5 and 6 manufactured in the comparative example 2 showed a mere shorter life of 50 to 10 times with respect to energizing cycles, because no ultrasonic vibrations were applied in the welding. Further, In the case of the specimens of Nos. 7 and 8 manufactured in the comparative example 3 showed only an extremely shorter life of 1 times with respect to energizing cycles, because the Al twisted-wire conductor is lower in conductivity and no ultrasonic vibrations were applied in the welding.

Comparative Example 4

An Al alloy billet was first manufactured which consists of Mg: 4.0 wt %, Mn: 0.4 wt %, Fe: 0.5 wt %, Si: 0.4 wt %, Zn: 0.25 wt % and balance made up of Al and unavoidable impurities. This Al alloy billet was hot-rolled into a material of which thickness is 5 mm, and then this rolled material was cold-rolled into that of a thickness of 2.3 mm. After being annealed, this cold-rolled was slit into a material of 45 mm in width, then the slit material was subjected to pressure welding and bending in this order so as to produce an Al terminal. This Al terminal was welded onto the foregoing Al twisted-wire conductor A with ultrasonic vibrations applied. However, the elongation of this terminal was only 18 percents, which caused a crack within the terminal in the welding operation.

Example 2

The two Al terminals Z manufactured in the example 1 were further subject to electroplating with Ni performed on the terminal at a thickness of 3 μm and to electroless plating with Ni—P alloy performed on the terminal at a thickness of 3 μm, respectively. Each of those Ni-plated Al terminals is welded onto the Al twisted-wire conductor A with ultrasonic vibrations applied (1400 W×1 sec.), so that two types of assemblies were produced.

Comparative Example 5

The three Al terminals Z manufactured in the example 1 were further subject to electroplating with Ni performed on the terminal at a thickness of 10 μm, to electroless plating of Ni—P performed on the terminal at a thickness of 10 μm, and to electroplating with Sn performed on the terminal at a thickness of 3 μm, respectively. Those plated Al terminals were used to produce three types of assemblies in a similar way with that in the example 2.

A 96-hours neutral salt spray test defined by JIS Z2371 was performed with each assembly manufactured in the example 2 and comparative example 5. After the spray test, the assemblies underwent the cycle test in the same way as that employed in the example 1 so that the life of each assembly was examined. For comparison, the life of terminals with no plating was also examined in the same way as above. The results of the test are shown in Table 2.

As clearly understood from Table 2, the assemblies according to the present invention (specimen Nos. 11 and 12) showed excellent terminal/cable connection characteristics. After the test at 1000 cycles, those assemblies according to the present invention exhibited electric resistance whose value was nearly 1.11 times larger than its initial value of electric resistance.

By contrast, the specimens of Nos. 13 and 14 of the comparative example 5 caused cracks therein in welding due to the thicker Ni-plated layer. Corrosive mediums penetrated into the cracks caused erosion, resulting in peeling off the Ni-plated layer.

Hence those specimens exhibited life no more than 1000 or less cycles but 501 or more cycles, which was the same as the specimen of No. 16 with no Ni-plated layer. Incidentally, it is considered that there are no problems in practicality if assemblies show life of 501 or more cycles through the test. The specimen of No. 15 was poor in the corrosion resistance of Sn plating, and showed life of 500 or less cycles but 101 or more cycles because the terminal reacted with the copper alloy.

TABLE 2

EC: electric conductivity

| Classification | | No. of Specimen | Al twisted wire conductor Type | Al twisted wire conductor EC % | Al terminal Type | Al terminal EC % | Al terminal surface treament | Thickness μm | Ultrasonic vibrations during welding | Life(The number of energizing cycles obtained when resistance exceeds 1.5 times larger than its initial resistance.) |
|---|---|---|---|---|---|---|---|---|---|---|
| The present invention | Example 2 | 11 | A | 59 | Z | 59 | Ni electroplating | 3 | applied | 1000 or more |
| | | 12 | A | 59 | Z | 59 | Ni—P electroless plating | 3 | applied | 1000 or more |
| Comparative Examples | Comparative Example 5 | 13 | A | 59 | Z | 59 | Ni electroplating | 10 | applied | 1000 or less, but 501 or more |
| | | 14 | A | 59 | Z | 59 | Ni—P electroless plating | 10 | applied | 1000 or less, but 501 or more |
| | | 15 | A | 59 | Z | 59 | Sn electroplating | 3 | applied | 500 or less, but 101 or more |
| | | 16 | A | 59 | Z | 59 | Nonplating | 0 | applied | 1000 or less, but 501 or more |

INDUSTRIAL APPLICABILITY

As described above, the assembly according to the present invention employs a construction wherein a metal terminal is attached to an Al twisted-wire conductor employed as the conductor of a distribution cable, so that the cable is lightened. The Al twisted-wire conductor can be made thinner in diameter, because its conductivity is 50% or more under IACS, providing an excellent flexibility. Thus the cable is easier to handle. On the other hand, the metal terminal is made from, preferably, an aluminum or aluminum alloy of which elongation is 20% or more. Therefore, no cracks will be caused when forming the terminal and welding the terminal onto the conductor. This metal terminal is welded onto the Al twisted-wire terminal under the application of ultrasonic vibrations, which will cause oxide layers formed on both of the conductor and the terminal to be destroyed. Thus, in pressure welding, the metal materials themselves of the conductor and the terminal come to be exposed and made to directly contact with each other, providing a superior connection characteristic with stability. In addition, coating Ni on the terminal is able to provide a satisfactory use even under a corrosive environment. Accordingly, the assembly has such remarkable advantages when used in industrial applications.

What is claimed is:

1. An electric distributor assembly comprising a distribution cable comprising an insulation-coated twisted-wire conductor made of an aluminum alloy and a connecting terminal connected to one end of said twisted wire conductor, wherein said aluminum alloy consists of Zr: 0.03 to 0.4 wt %, Fe: 0.05 to 0.2 wt %, and Si: 0.05 to 0.2 wt % and further includes in total 0.003 to 0.05 wt % of one or more elements selected from Be, Sr, Mg, Ti and V, and the balance consists of Al and unavoidable impurities;

said connecting terminal connected to said twisted-wire conductor is made of a metal, and said twisted wire conductor and said connecting terminal are connected by pressure welding with ultrasonic vibrations.

2. The electric distributor assembly of claim 1, wherein said metal for said connecting terminal comprises an aluminum or an aluminum alloy whose elongation is 20% or more.

3. The electric distributor assembly of claim 2, wherein said aluminum alloy for said connecting terminal consists essentially of Zr: 0.03 to 0.4 wt % and Si: 0.05 to 0.15 wt % and the balance consists of Al and unavoidable impurities.

4. The electric distributor assembly of claim 2, wherein said aluminum alloy for said connecting terminal conductor consists essentially of Mg: 0.3 to 1.8 wt %, Si: 0.15 to 1.5 wt %, Fe: 0.1 to 1.0 wt %, Cu: 0.05 to 0.5 wt % and further in total 0.03 to 0.6 wt % of one or more elements selected from Mn, Cr and Ti, and the balance consists of Al and unavoidable impurities.

5. The electric distributor assembly of any one of claims 1, wherein said connecting terminal is coated on a surface thereof with Ni or an Ni alloy which has a thickness of 5 $\mu$m or less.

6. The electric distributor assembly of claim 1, which further comprises an electromagnetic shielding metal layer for covering an outer surface of said insulation-coated twisted-wire conductor and further an insulation-coated layer covering said outer surface of said electromagnetic shielding metal layer.

7. The electric distributor assembly of claim 6, wherein said electromagnetic shielding metal layer comprises a reticulated member comprising an aluminum or an aluminum alloy.

8. An aluminum alloy, which can used for a connecting terminal of an electric distributor assembly comprising a distribution cable and said connecting terminal, said alloy consisting of Mg: 0.3 to 1.8 wt %, Si: 0.15 to 1.5 wt %, Fe: 0.1 to 1.0 wt %, Cu: 0.05 to 0.5 wt %, further in total 0.03 to 0.6 wt % of one or more elements selected from Mn, Cr and Ti, and the balance consists of Al and unavoidable impurities.

* * * * *